United States Patent [19]

O'Dea et al.

[11] 3,863,032

[45] Jan. 28, 1975

[54] TRANSLATOR ALARM

[75] Inventors: Orrin B. O'Dea, Garden Grove; Luis A. Arce, Lakewood; Ralph Morrison, Pasadena, all of Calif.

[73] Assignee: Communication Mfg. Co., Long Beach, Calif.

[22] Filed: Apr. 6, 1973

[21] Appl. No.: 348,477

[52] U.S. Cl. ...................... 179/18 ET, 179/175.2 C

[51] Int. Cl. ............................................ H04q 3/47

[58] Field of Search... 179/18 ET, 175.2 C, 175.2 R

[56] References Cited

UNITED STATES PATENTS

| | | | |
|---|---|---|---|
| 3,099,720 | 7/1963 | Gotthardt | 179/175.2 R |
| 3,681,534 | 8/1972 | Burian et al. | 179/18 ET |
| 3,725,614 | 4/1973 | Slana | 179/175.2 R |

*Primary Examiner*—Thomas W. Brown
*Attorney, Agent, or Firm*—Christie, Parker & Hale

[57] ABSTRACT

Translator alarm for detecting erroneous electrical connections between any pair of terminals and between different pairs of terminals of a matrix. The alarm has a plurality of pairs of terminals for connection to the pairs of terminals of the matrix. A circuit applies a potential between each of the terminal pairs and is adapted for applying a signal on one terminal of each terminal pair, thereby forming a cascaded signal from one terminal pair to another. A first detecting circuit, for each terminal pair, senses the potential between the corresponding terminal pair. A second detecting circuit, for each terminal pair, senses the signal on at least one of the corresponding terminal pairs. The second detecting circuit has two inputs, one of which receives a signal from the at least one terminal of the corresponding terminal pair and the second of which receives a reference signal from the output of the first detecting circuit.

11 Claims, 3 Drawing Figures

TRANSLATOR ALARM

CROSS-REFERENCE TO RELATED APPLICATION

This patent application discloses the same subject matter as the patent application entitled "Translator Cross-Alarm" filed in the name of Ralph Morrison, now bearing Ser. No. 348,476 filed on even date herewith. This present patent application is directed to the same embodiment disclosed in FIG. 3 of the above-identified patent application.

BACKGROUND OF THE INVENTION

This invention relates to translating devices and more particularly to circuits for checking the proper operation thereof.

Translator circuits are commonly used in telephone equipment to detect the source of calls and to cause the call to be appropriately charged to a subscriber. A read only type memory is used in the translator for identifying the customer originating a call. One translator circuit is of the type disclosed in the Manual Crossbar Systems No. 5 Translator Circuit AMA CD–26019–01 Issue 2D by Bell Telephone Laboratories, Incorporated.

It is essential that workmen be allowed to work in and around the translator making repairs and changes. However, workmen inadvertently drop wires or other metal parts into the translator, causing various terminals in the translator to be shorted together. Translators utilize a combination of relays in combination with the read only memory. If a call is originated by a first customer while the short exists, the combination of relays actuated together with the short may cause a charge to be erroneously made to a second customer. It is therefore desirable to detect the short immediately upon forming the short before a customer originates a call to prevent malfunction of the translator.

Translator alarm detectors have been provided for detecting erroneous connections between terminals. One type of detector is one wherein each terminal pair is coupled to one side of a relay coil, the relay coil is energized when the translator is operated, for example, by a subscriber making a legitimate call in combination with an erroneous short. However, such a detector requires that the translator actually be used by a customer before the relay coil is energized. Obviously such an arrangement may cause a charge to be erroneously made to another customer. With the aforementioned system, it is not possible to know about the short circuit until after the erroneous charge is made. This is highly undesirable because of customer aggravation and waste of time required to correct the erroneous charge, etc.

Other arrangements have been proposed for solving the aforementioned problem. One such arrangement requires a memory and a scanner to compare switch states on a recurring basis. However, such a method is very difficult to apply to the translator and is highly expensive. Another approach is to use pulse circuitry to sense the shorts. However, this approach is undesirable because of the expense involved.

BRIEF SUMMARY OF THE INVENTION

Briefly, an embodiment of the present invention involves a translator alarm for detecting erroneous connections between any pair of terminals and between different pairs of terminals of a matrix. Provided is a plurality of terminal pairs and a source of potential having first and second sides. First impedance means, for each terminal of each terminal pair, is coupled between the corresponding terminal and one side of the source. Second impedance means for each terminal of each terminal pair is coupled between the corresponding terminal and the other side of the source. The values of the impedances vary from terminal pair to terminal pair so as to provide a series of cascaded signals from one terminal pair to another when current flows between individual terminal pairs. The first signal detecting means for each terminal pair has separate inputs coupled to the terminals of the corresponding terminal pair and an output. The first signal detecting means is responsive to a first signal between the corresponding terminal pair for providing at its output a reference output signal having a predetermined relation to the cascaded signal on the corresponding terminal pair, and responsive to an altered signal between corresponding terminal pairs for providing at the output a changed output signal. Second signal detecting means for each terminal pair has one input coupled to the corresponding terminal pair and a second input coupled to the output of the first signal detecting means which is coupled to the corresponding terminal pair. The second signal detecting means is adapted for providing a predetermined output responsive to an altered signal on the corresponding terminal pair relative to the reference signal thereto or responsive to the changed signal from the first signal detecting means.

An important advantage of this arrangement is that only the output from the second signal detecting means need be monitored to determine whether there is a short, either between terminals of the same terminal pair, or from one terminal pair to another. As a result, additional gating and logic in order to combine the output of the two signal detecting means is eliminated. Additionally, it is now possible to connect the outputs of the second signal detecting means through diodes to a common line which in turn can be used as the input to an alarm circuit.

According to a preferred embodiment of the invention, a voltage divider circuit is provided for at least one of the terminal pairs. The voltage divider is coupled between the source of potential and one of the terminals of the corresponding terminal pair. The voltage divider has an output coupled to one of the inputs of the corresponding first signal detecting means to thereby provide a bias potential thereon with respect to the other input.

According to a further preferred embodiment of the invention, a voltage divider is provided for at least one of the first signal detecting means. The voltage divider is coupled between the output of the corresponding first signal detecting means and the source of potential. The voltage divider has an output coupled to the second input of the corresponding second signal detecting means, thereby enabling the proper bias to be provided to the second signal detecting means.

According to a still further preferred embodiment of the present invention, a plurality of visual indicating means are provided together with means coupling the visual indicating means to the outputs of different ones of the second signal detecting means. The visual indicating means are responsive to the predetermined output signal from the corresponding second signal detecting means for providing a unique visual indication.

According to a still further embodiment of the invention, the visual indicating means are lamps.

An additional embodiment of the present invention comprises means for each of a plurality of the terminal pairs for selectively applying a bias signal to one terminal of the terminal pair. Preferably, the means for selectively applying the bias signal comprises a manually operable switch means for coupling a source of potential to such one terminal of the terminal pair. With such an arrangement, it is possible to selectively apply the bias signals to the corresponding terminals of the terminal pair or manually operate the switch for applying a potential to such terminal to isolate the terminal pairs to which a short exists.

According to a still further embodiment of the invention, an alarm is responsive to the predetermined output from any one of the second signal detecting means for providing an alarm indication. Preferably, the alarm is audible.

According to a still further preferred embodiment of the invention, a time delay circuit is coupled between the output of each of the second signal detecting means and the alarm to prevent the alarm indication for momentary changes in signal, either between terminals of a terminal pair or on a terminal pair.

DESCRIPTION OF THE PREFERRED EMBODIMENTS

Figure 2:
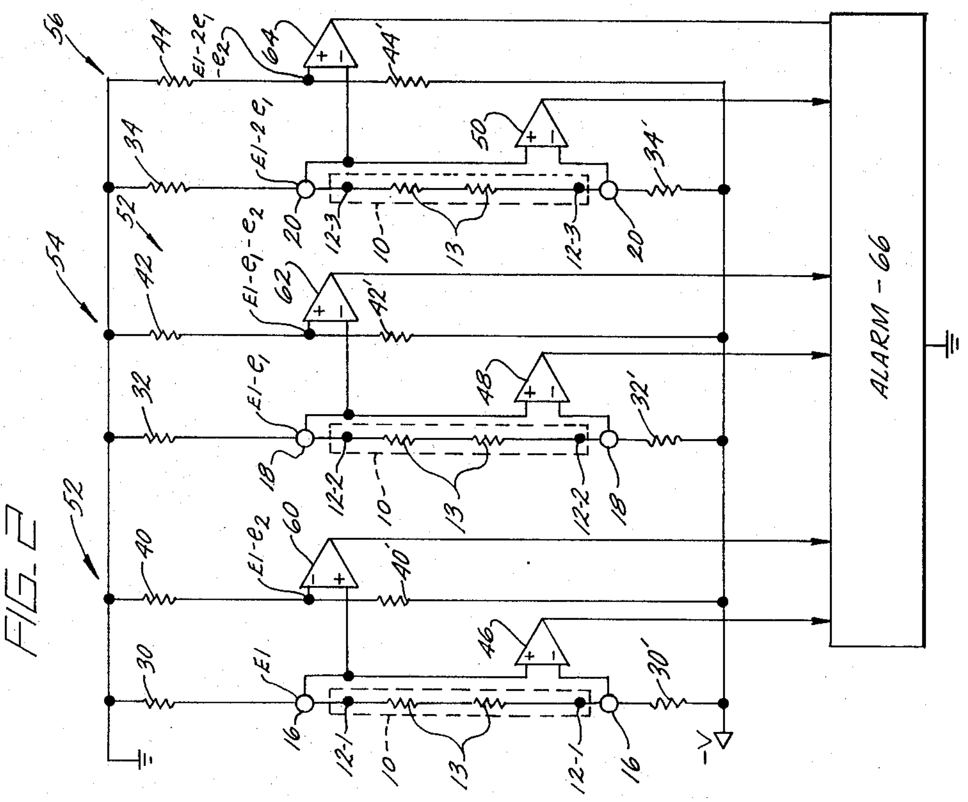
FIG. 2 is a schematic and block diagram of a specific translator alarm generally depicted in FIG. 1 also by way of background to the present invention.
Figure 1:
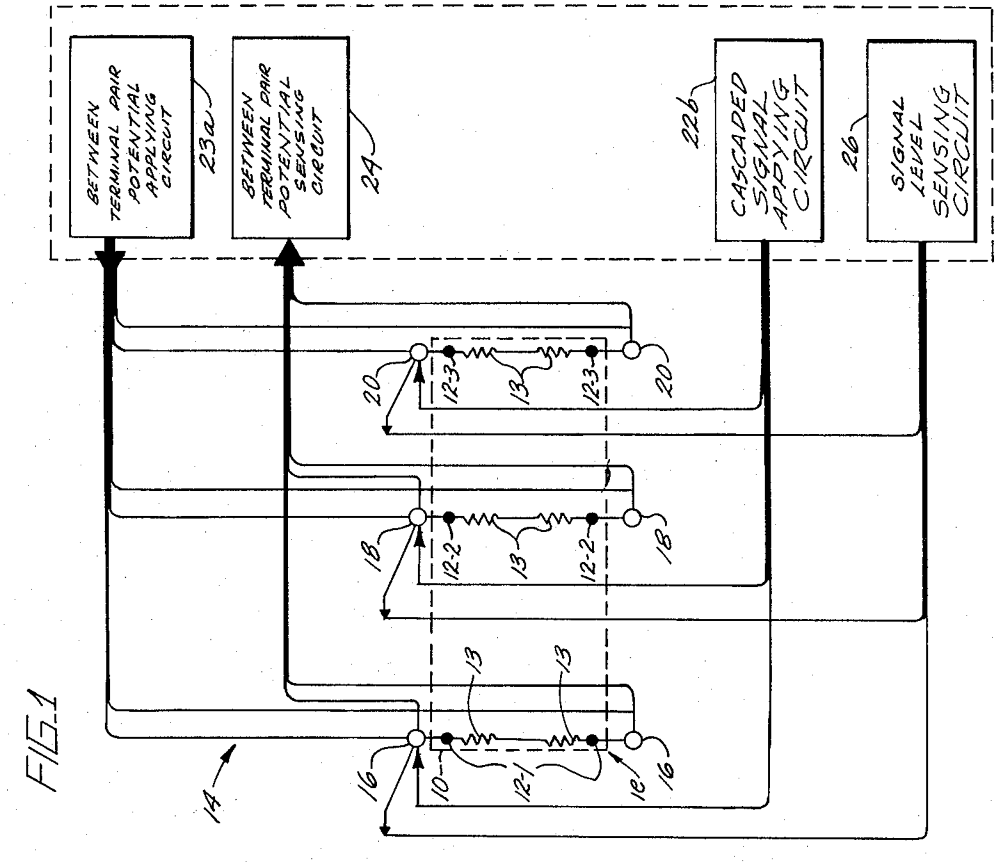
FIG. 1 is a general schematic and block diagram of a translator alarm by way of background information to the present invention.

FIGS. 1 and 2 will first be described by way of background before describing the present invention shown in FIG. 3.

Refer now to the block diagram of FIG. 1. 10 generally depicts a matrix consisting of a translator of the general type referred to hereinabove. The only parts of the matrix 10 shown are a plurality of terminals arranged by way of example into three terminal pairs 12–1, 12–2, and 12–3 with impedances 13 connected between terminal pairs. The terminals 12 generally depict test points, connectors or other conductors in the matrix of 10 which are exposed and subject to possible accidental shorts. Although matrix 10, by way of example, is the above-referenced translator, it may be any one of a number of different types generally characterized in that (1) an impedance is connected between each individual terminal pair, or (2) it is possible to connect an impedance therebetween of selected value so as to provide a path for current flow in between each individual terminal pair, and (3) there is no connection from one terminal pair to another, or (4) the connection from one terminal pair to another is such that it will allow the establishment of cascaded signals from one terminal pair to another. In the aforementioned translator, the impedances 13 are resistors that are already connected between the terminal pairs 12.

The translator alarm 14 consists of everything depicted in FIG. 1 except for the matrix 10 indicated by dashed lines. A plurality of terminal pairs 16, 18, and 20 are connected, respectively, to matrix terminal pairs 12–1, 12–2 and 12–3. Thus there is one translator terminal pair for, and connected to, each of the matrix terminal pairs.

The translator alarm 14 also includes a means 22*a* and 22*b* for applying an electrical potential between each of the translator terminal pairs 16, 18, and 20. Additionally, the means 22*a* and 22*b* is adapted for applying cascaded signals from one terminal pair to another. For purposes of illustration, between terminal pair potential applying circuit 22*a* is shown having a separate pair of output lines coupled across each of the terminal pairs 16, 18, and 20. Between terminal pair potential, applying circuit 22*a* applies a current signal between each terminal pair and due to the impedance 13 a potential difference is established in between each of the terminal pairs.

A cascaded signal applying circuit 22*b* is detected for applying the cascaded signals to the terminal pairs 16, 18 and 20. Since the individual terminal pairs 16, 18, and 20 are interconnected by means of the impedances 13, a bias applied to one of the terminals of each pair will bias the other terminal of each pair, thereby causing cascaded signals on the other terminals of slightly different value than the first mentioned cascaded signals.

A between terminal pair potential sensing circuit 24 senses the potential difference between individual terminal pairs. In a preferred embodiment, there is a separate potential sensing circuit for each terminal pair 16, 18, and 20.

A signal level sensing circuit 26 is depicted for sensing the signal at each of the terminal pairs 16, 18, and 20. Again a preferred embodiment of the invention has a separate circuit for each terminal pair for sensing the signal on at least one of each of the terminal pairs 16, 18, and 20.

In operation, the between terminal pair potential applying circuit 22*a* causes a current to flow between each of terminal pairs 16, 18 and 20, through impedances 13, thereby establishing a potential difference between each pair of translator terminals. The cascaded signal applying circuit 22*b* applies a series of cascaded signals from one translator terminal pair to another.

Assume that no short exists between any of the matrix terminals. Under these conditions, the between terminal pair potential sensing circuit 24 senses the presence of a potential difference between each of the matrix terminal pairs and provides a first output signal. Also, the signal level sensing circuit 26 senses that the signal (with respect to ground) on each of the terminal pairs is of the proper level and also forms a first output signal.

Assume a short is established between terminal pairs 16. The potential difference between terminal pairs 16 is eliminated, but the signal on terminal pair 16 with respect to ground does not change appreciably. Therefore the signal level sensing circuit 26 still forms the first output signal. However, the between terminal pair potential sensing circuit 24 senses the lack of a potential difference between terminal pairs 16 and forms a second alarm signal, thereby indicating a short exists.

Assume a short between the upper terminal of terminal pair 16 and one of terminal pair 18. Also assume that the applied cascaded signal is establishing a lower signal on terminal pair 18 than terminal pair 16. Substantially the same current flows between terminal pairs 16 and the same potential difference exists between terminal pairs 16. Hence the between terminal pair sensing circuit 24 still forms the first output signal. However, this condition will cause the signal on terminal pair 16 to drop to a signal intermediate that of the signals applied to terminals 16 and 18. The signal level sensing circuit 26 senses the erroneous signal at terminal pair 16 and forms a second alarm signal.

Refer now to FIG. 2. The electrical signal applying means comprises a power supply or source of potential depicted between ground and −V1. Also included in the electrical signal applying means is a first impedance 30, 32, and 34 for one terminal of each translator terminal pair for coupling the corresponding terminal to one side of the source (e.g., ground). A second impedance 30′, 32′ and 34′ is provided for the other terminal of each translator terminal pair for coupling the corresponding terminal to the second side of the source (e.g. −V).

With such an arrangement, the impedances 30 through 34 and 30′ through 34′ in combination with impedances 13 provide a current signal between each of the terminal pairs 16, 18 and 20. Thus a current is established passing between each of the terminal pairs 16, 18, and 20 via the impedances 13 which creates a potential difference between terminal pair.

The means for each terminal pair for sensing a potential in between the corresponding terminal pair consists of detecting circuits 46, 48 and 50. The detecting circuits have a pair of inputs which are coupled across the corresponding translator terminal pair.

Means 52, 54 and 56 are provided for each terminal pair for sensing the signal on at least one of the corresponding translator terminal pairs 16, 18, and 20. Each of the means 52, 54 and 56 consist of a voltage divider and a potential difference sensing means or detecting circuit. The voltage dividers in 52, 54 and 56 are formed by resistors 40–40′, 32–32′, and 34–34′, respectively. The junction between the voltage dividers provide a series of cascaded reference signals, one reference signal for each of the terminal pairs 16, 18, and 20. The detecting circuits 60, 62 and 64 of means 52, 54 and 56 each having one input coupled to the cascaded reference signal from the corresponding voltage divider and a second input coupled to the cascaded signal from the corresponding translator terminal pair. Means in the form of an alarm 66 is provided for indicating a short either between terminals of the same terminal pair or from one terminal pair to another.

Consider now the cascaded potentials at the terminal pairs 16, 18, and 20 and the relation thereof to the cascaded signals formed by the voltage dividers. The impedances 13 between each of the matrix terminals 12–1, 12–2 and 12–3 are of the same value and the relative value of the impedances 30 to 34 and 30′ to 34′ are selected in a well known manner such that staggered signals are provided from one terminal pair to another terminal pair when current flows in between terminal pairs. For example, the signal at the upper one of the terminal pairs 16, 18, and 20 may be represented by the cascaded voltages E1, E–$e_1$, E1–2$e_1$, where $e_1$ depicts the desired difference or incremental voltage from one terminal pair to the next. It should be noted that the voltage difference from one translator terminal pair to the next need not be the same but may be different. The cascaded signals at the lower one of the terminal pairs 16, 18, and 20 will have a similar relationship. The voltage dividers of the circuits 52, 54 and 56 form a series of cascaded reference signals, one reference signal for each of the terminal pairs 16, 18, and 20. The cascaded reference signals are related to the cascaded signals applied to the terminal pairs 16, 18, and 20. The cascaded reference signals formed in circuits 52, 54 and 56 are depicted by the cascaded voltages E1–$e_2$, E1–$e_1$–$e_2$ and $E_1$–2$e_1$–$e_2$. Thus the cascaded reference voltages are lower than that of the corresponding cascaded voltages (at the upper one of terminal pairs 16, 18 and 20) by an amount $e_2$. It should be noted that the voltage difference between the applied and reference value need not be the same but could be different from one terminal pair to the next.

The detecting circuits 46, 48, 50, 60, 62 and 64 each are the type which forms a first output when the input signal at one input (+) is positive with respect to the signal at the other input (−) and provides a second output signal when the signal across the input is reversed or 0. The + and − signs are used in FIG. 2 to depict the corresponding terminals.

Consider now the operation of the translator alarm depicted in FIG. 2. Assume initially that no shorts exist and the translator alarm is in operation. Current flows between ground and −V via resistors 30–30′, 32–32′ and 34–34′ and the corresponding resistors 13 (not shown) in the matrix 10. As a result, a voltage is developed between terminal pairs 16, 18, and 20 which is positive at the upper terminal with respect to the lower terminal. This causes the corresponding detecting circuits 46, 48 and 50 to form a first output indicating the lack of any shorts between the same terminal pairs. Additionally, current flows between ground and −V terminal via the voltage divider resistors 40–40′, 42–42′ and 44–44′. This causes the voltage at each junction between each pair of voltage divider resistors to form a signal which is slightly negative with respect to the voltage on the upper terminal of the corresponding terminal pair. This in turn causes the corresponding detecting circuits 60, 62 and 64 to form a first output indicative of the lack of any shorts from one terminal pair to another terminal pair.

Assume now that a short occurs between terminal pair 16. The potential across the input to the detecting circuit 46 drops to zero, causing the detecting circuit 46 to form a second alarm output indicating a short between the corresponding terminal pair. This energizes the alarm 66 causing it to form an output signal indicating a short.

Assume that the short between terminal pair 16 is removed and that a short occurs between the upper one of terminal pair 16 and the lower one of terminal pair 20. Under these conditions, the voltage at the lower terminal of terminal pair 20 causes the voltage at the upper one of terminal pair 16 to drop. The value of the resistors 13 is in the order of one three-hundredth of that of resistor pairs 30–30′ or 32–32′ or 34–34′. Therefore, the voltage at the lower one of terminal pair 16 also drops about the same amount as the upper one. Therefore, the detecting circuit 46 does not detect a short and still forms its first output.

However, the drop in potential in the upper one of terminal pair 16 causes the + input of detecting circuit 60 to drop below the potential $E_1$–$e_2$ formed by the voltage divider resistors 40–40′ at its other input. As a result, the detecting circuit 60 forms a second alarm output causing the alarm 66 to again form an output indicating the short. A similar analysis can be used to show the operation of the other detecting circuits.

Figure 3:
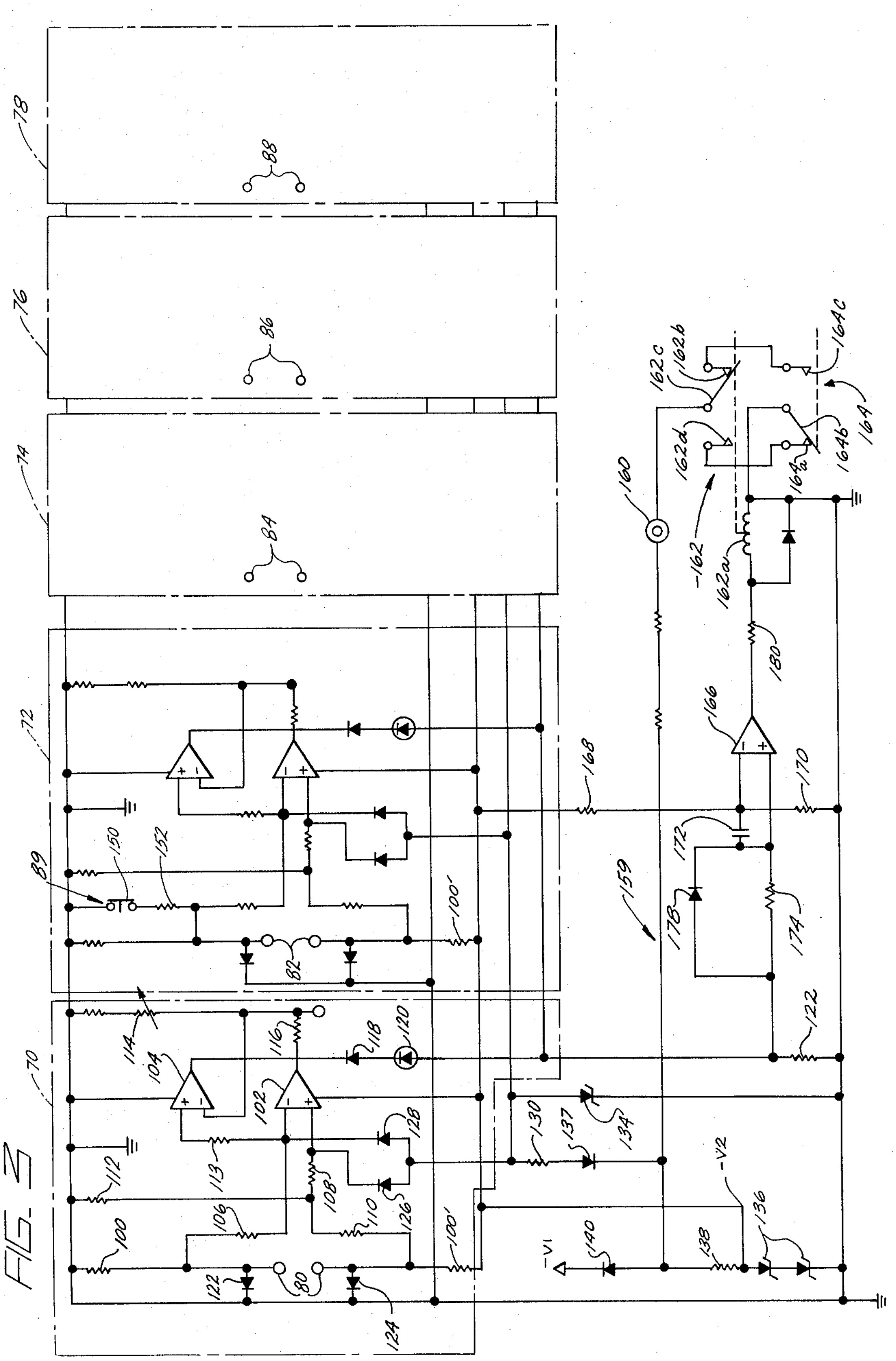
FIG. 3 is an embodiment of a translator alarm and embodies the present invention.

Refer now to the present invention shown in FIG. 3. Five translator alarm terminal pairs 80, 82, 84, 86 and 88 are depicted. Rather than show the details of the entire translator alarm of FIG. 3., only stages 70 and 72 are shown in detail, stages 74, 76 and 78 being depicted by dashed lines as they are essentially the same as stage 72. Stage 70 is also quite similar to stages 72–78 except that it does not have a reset circuit 89 which is present in stages 72–78. The reset circuit 89 will be discussed in more detail hereinafter.

Since the stages are essentially the same except for the reset circuit, stage 70 will be described in detail and subsequently the modification provided by the reset circuit 89 will be described. In order to provide a clear understanding of the relation between the elements of FIGS. 1 and 2 and that of FIG. 3, the correspondence will be pointed out. A source of potential is indicated generally between the ground terminal and a –V2 output of a power supply. Resistors 100–100' correspond to resistors 30–30' of FIG. 2 and form first and second impedance means, one for each terminal of the pair for coupling the corresponding terminal pair 80 across the power supply. The resistors 100–100', as resistors 30–30', are selected in value varying from terminal pair to terminal pair so as to provide a series of cascaded signals from one terminal pair to another when current flows between individual terminal pairs. Detecting circuits 102 and 104 correspond to detecting circuits 46 and 60 of FIG. 2. The detecting circuits 102 and 104 of FIG. 3 are actually an integrated circuit chip manufactured by Signetics, known as the 5558, but are depicted as separate circuits in FIG. 3 for ease of explanation. The detecting circuit 102 has a pair of inputs which are coupled through resistors 106 and 108 across the terminal pair 80. The value of resistors 106 and 108 are in the order of 10 to 20 times higher than that of the resistance connected between terminals 80 and therefore a negligible amount of current flows through resistors 106 and 108 as compared with the current flowing between the terminal pair 80. Resistors 112 and 110 are serially connected together between the ground connection and the lower one of the terminal pair 80. Resistors 112 and 110 form a voltage divider having an output connected to one input of detector 102 for biasing the same and thereby provide the proper voltage difference between the inputs of the detecting circuit 102.

Important to the present invention, the detecting circuit 104 has its – input connected to the output of detecting circuit 102 and has its + input connected through a resistor 113 and the resistor 106 to the upper one of the terminal pair 80. This connection between the detecting circuits 102 and 104 permits only the output of the detecting circuit 104 to be monitored in order to detect a short in each stage, either between the same terminal pair or from one terminal pair to another. This is in contrast to the circuits of FIG. 2 where both detectors of each stage must be monitored or an "OR" type gate connected across both outputs to provide the single output.

Looking in more detail at the interconnection between the detecting circuits 102 and 104, the output of detecting circuit 102 is connected serially through resistors 116 and 114 to ground. The voltage detecting circuits 102 and 104 are characterized in that a large negative potential is formed at the output thereof which is slightly less than equal to the power supply potential of –V2 when the potential across the input thereof is a positive potential at the + input with respect to the – input, whereas a signal approximately equal to ground is formed at the output when the potential across the inputs is 0 or reversed. The resistors 114 and 116 form a voltage divider with an output connected to an input of detector 104, and cooperate with the normal large negative output signal from the detecting circuit 102 to provide a reference voltage at the – input to the detecting circuit 104 which is slightly lower than the voltage at the upper one of terminal pairs 80.

The output of the detecting circuit 104 is serially connected through a diode 118, a light emitting means or light emitting diode 120 and a resistor 123 to ground. The diode 120 forms a visual indicating means. To be explained in more detail, detecting circuit 104 forms a negative output signal which energizes the light emitting diode 120 whenever a short exists either between terminal pairs or from one terminal pair to another.

Diodes 122 and 124 are coupled between ground and the terminal pair 80 in order to protect the detecting circuits 102 and 104 against large positive voltage spikes appearing between the terminals 80. Diodes 126 and 128 are connected between the inputs to the detecting circuit 102 and a common junction which in turn is serially connected through resistor 130, diode 132 to the power supply. The diodes 126 and 128 prevent voltage swings from being applied to the inputs of the detecting circuits, which voltage swings are greater than the output from the power supply.

Returning to the power supply, the power supply is formed by the series connection of a diode 140, resistor 148, and a pair of Zener diodes 136 connected between a –V1 source of potential and ground. The junction between the diode 140 and resistor 148 are connected to the cathode of the diode 132 for providing the clamping voltage for the diodes 126 and 128. The junction between the resistor 138 and the upper Zener 136 provides the source of potential –V2.

The reset circuit 89 of stage 72 is connected essentially the same in stages 74–78, therefore only reset circuit 89 of stage 72 will be explained. The reset circuit 89 comprises the series connection of a normally open, manually operable switch 150 and a resistor 152, serially connected between ground and the upper terminal pair 82. To be explained in more detail, reset circuit 89 is used to apply a bias signal to the upper terminal of the terminal pair upon closure of switch 150, in order to determine the location of a short.

In one embodiment of the invention, the values of the resistors for stages 70 through 78 are selected so as to provide a current of 10 micro-amperes between each terminal pair with a 10k ohm resistance connected between each pair of terminals, about a 30 volt swing in voltage at the output of the detectors and values of cascaded voltage at the upper and lower terminals of the terminal pairs as indicated in Table I.

TABLE I

| Terminal Pair | Upper | Lower |
|---|---|---|
| 80 | –7.95 | –8.028 |

TABLE I-Continued

| Terminal Pair | Upper | Lower |
|---|---|---|
| 82 | −11.7 | −11.82 |
| 84 | −16.5 | −16.57 |
| 86 | −19.70 | −19.79 |
| 88 | −24. | −24.08 |

Consider now the operation of the circuit of FIG. 3 thus far described. Assume that the circuit is in operation with each of the terminal pairs 80, 82, 84, 86 and 88 connected across a 10k resistance as depicted in FIGS. 1 or 2. Current flows between the terminal pairs 80–88 from ground to the −V2 potential creating a first signal in the form of a positive potential on the − input with respect to the + input of the detecting circuit 102 of each of the stages 70–78. Accordingly, the detecting circuit 102 forms a negative output which in turn causes a negative input to the corresponding detecting circuit 104.

The voltage divider formed of resistors 114 and 116 is responsive to the negative signal from detector 102 to apply a reference signal to detector 104. The reference signal causes the signal across the − to + input of detecting circuit 104 to be reversed, causing detector 104 to form a 0 volt output signal and the light emitting diode 120 to be extinguished.

Assume that a short occurs between terminal pair 80. The short between terminal pair 80 will cause the potential between the terminal pair 80 to be eliminated dropping to an altered signal of 0 volts. Current flowing through resistors 110 and 112 will cause a positive input on the + input with respect to the − input of detecting circuit 102 which in turn will cause the detecting circuit 102 to form a 0 volt output signal. The 0 volt output from detecting circuit 102 via the voltage divider resistors 114 and 116 causes changed signal at the − input of detecting circuit 104 which is above the negative potential at the + terminal thereof which in turn causes detecting circuit 104 to form a predetermined negative output signal approximately equal to the power supply −V2, thereby energizing the light emitting diode 120. Energization of the light emitting diode 120 indicates that there is a short in the translator alarm system and one of the terminals affected is one of the terminal pair 80.

However, it cannot be visually determined at this point whether the short is between terminal pair 80 or from terminal pair 80 to one of the other terminal pairs in the system. Therefore, the user actuates each one of the switches 150 in the reset circuits 89 in stages 72 through 78. Since the short is between terminal pair 80, the light emitting diode 120 will not be de-energized by actuation of the switches, therefore it can be deduced that the short is between terminal pair 80 rather than from one of terminal pair 80 to some other point in the system.

Assume now that the short between terminal pair 80 is removed and that a short occurs between the upper one of terminal 80 and one of terminal pair 82. In stage 70, the short will cause the voltage at the upper terminal pair 80 to drop and thereby cause the potential at the + input of detecting circuit 104 to fall below the voltage at the − input. This will cause the detecting circuit 104 to change states and form a negative output which again energizes light emitting diode 120.

Assume now that an operator actuates the switch 150 in each of the resetting circuits 89 of stages 72–78. The operator under these conditions will discover that actuation of switch 150 in stage 72 raises the voltage at the upper one of terminal pair 82 and thereby draws the voltage on the upper one of terminal pair 80 sufficiently high that the + input of detecting circuit 104 becomes higher than the voltage at the − input. Under these conditions, the detecting circuit 104 forms essentially a 0 volt output and the light emitting diode 102 will be extinguished. It is then known that the short exists between one of terminal pair 80 and one of terminal pair 82.

Therefore, the detecting circuit of FIG. 3 provides a novel, simple, reliable and low cost method for determining the points between which a short exists in the matrix across which the terminal pairs are connected.

Consider now the audible alarm system; the anode of light emitting diode 120 in each of stages 70–78 are connected together through a resistor 122 to ground. Whenever any one of the light emitting diodes is energized, the signal at the junction of the resistor 122 in the light emitting diodes drops to a large negative voltage which is slightly less than the potential at −V2. This signal is used to activate an audible horn 160.

A relay 162 has a coil 162*a* connected between ground and a detecting circuit 166 through a resistor 180. The relay 162 has a contact 162*b* and 162*d* and a pole 162*c* which is in contact with contact 162*b* when the coil 162*a* is not energized. A switch 164 has contact 164*a* and a pole 164*b*, the latter normally being in contact with contact 164*a*. The detecting circuit 166 is similar in construction and operation to detecting circuits 102 and 104 and has a + input connected through a resistor 174 to the junction of resistor 122 and the anode of light emitting diodes 120. The − input of detecing circuit 166 is connected to a voltage dividing circuit comprising the serial connection of resistors 168 and 170 which are connected between −V2 and ground. The junction of resistors 170 and 168 is also connected through a capacitor 172 to the − input of detecting circuit 166. A diode 178 is connected in parallel with the resistor 174.

Consider now the operation of the audible alarm system 159. Assume that there are no shorts, accordingly, none of the light emitting diodes 120 have been energized. Under these conditions, essentially no current is passing through the resistor 122 and accordingly the + input of detecting circuit 166 is at ground. The voltage dividing resistors 168 and 170 bias the − input of detecting circuit 166 at a slightly negative potential causing the output thereof to be essentially at 0 volts which in turn causes the relay 162 to be de-energized and the contacts to be as shown in FIG. 3.

Assume now that one of the light emitting diodes 120 is energized as described hereinabove. A current under these conditions will flow through the resistor 122, causing a large negative potential to suddenly be applied at the junction of resistor 122 and the light emitting diodes 120. The large negative potential in turn causes both terminals of the detecting circuits 166 to drop approximately the same amount. The capacitor 172 forms a temporary memory device which maintains the same potential difference between the detecting circuit 166 as existed prior to the drop in voltage. Should the short go away rapidly, the circuit will return to its initial condition, the relay 162 will not be energized and no audible alarm will be sounded. Thus, elements 122, 168, 170, 172, 174 and 178 form a delay circuit coupled between the output of each of detectors 104 and the input to the alarm system at detector 166.

Assume that the short is not temporary but a permanent short. The capacitor 172 will charge through resistors 174 and 170 until the voltage on the + input of the detection circuit 156 drops below that on the − input. At this point, the output signal from detecting circuit 156 will drop to a large negative potential, energizing the coil 162*a* of relay 162, causing the pole 162*c* to go in contact with contact 162*d*.

Under this condition, current will flow from the power supply to ground through the horn 160, pole 162*c*, contact 162*d*, contact 164*a* and pole 164*b*. Should it be desired to stop the sound of the horn, the switch 164 can be actuated disconnecting pole 164*b* from contact 164*a* thereby opening the circuit with the horn 160.

Assume that the short is removed, under these conditions, the signal applied across the resistor 122 returns to its initial 0 volt condition and the capacitor 172 rapidly discharges through the circuit including diode 178 and resistors 170 and 122.

Although an exemplary embodiment of the invention has been disclosed for purposes of illustration, it will be understood that various changes, modifications, and substitutions may be incorporated in such embodiment without departing from the spirit of the invention as defined by the claims appearing hereinafter.

What is claimed is:

1. A detecting apparatus for detecting erroneous electrical connections between any pair of matrix terminals and between different pairs of matrix terminals in a matrix, the apparatus comprising:

a. a plurality of terminal pairs;

b. a source of potential having first and second sides;

c. first impedance means, for each terminal of each terminal pair, coupled between the corresponding terminal and one side of said source;

d. second impedance means, for each terminal of each terminal pair, coupled between the corresponding terminal and the other side of said source;

e. the value of the impedances of the impedance means varying from terminal pair to terminal pair so as to cause a signal on at least one terminal of each terminal pair, the signals forming a series of cascaded signals from terminal pair to terminal pair when current flows between terminal pairs through the impedance means;

f. first signal detecting means for each terminal pair having separate inputs coupled to each terminal of the corresponding terminal pair and an output, each of the first signal detecting means being responsive to a first signal between the terminals of the corresponding terminal pair for providing at said output a reference output signal having a predetermined relation to the cascaded signal on the at least one terminal of the corresponding terminal pair and being responsive to an altered signal between the terminals of the corresponding terminal pair for providing at said output a changed output signal; and g. second signal detecting means for each terminal pair having one input coupled to receive signals on the at least one terminal of the corresponding terminal pair and a second input coupled to receive signals at the output of the first signal detecting means which is coupled to the corresponding terminal pair, the second signal detecting means being adapted for providing a first output signal responsive to the combination of the presence of said cascaded signal on the corresponding terminal pair and the reference signal and adapted for providing a second output signal responsive to an altered signal on the at least one terminal of the corresponding terminal pair, relative to the reference signal thereto, or responsive to the changed signal from the first signal detecting means.

2. An apparatus according to claim 1 comprising for at least one terminal of each of said terminal pairs a voltage divider coupled between the source of potential and one of the terminals of the corresponding terminal pair, each voltage divider having an output coupled to one of the inputs of the corresponding first signal detecting means to thereby provide a bias potential thereto.

3. An apparatus according to claim 1 wherein said first signal detecting means comprises a voltage detector having an output, a voltage divider coupled between the output of the voltage detector and said source of potential, said voltage divider comprising an output coupled to said second input of the corresponding second signal detecting means.

4. An apparatus according to claim 1 comprising:

a. a plurality of visual indicating means; and b. means coupling said visual indicating means to the outputs of different ones of said second signal detecting means.

5. An apparatus according to claim 4 wherein said visual indicating means comprises light emitting means.

6. An apparatus according to claim 1 comprising means, for each of a plurality of said terminal pairs, for selectively applying a bias signal to one terminal of such plurality of terminal pairs.

7. An apparatus according to claim 6 comprising manually operable switch means for coupling a source of potential to such one terminal of such plurality of terminal pairs.

8. An apparatus according to claim 1 comprising an alarm generating means responsive to the predetermined output signal from any of said second signal detecting means for providing an alarm indication.

9. An apparatus according to claim 8 wherein said alarm generating means forms an audible alarm.

10. An apparatus according to claim 8 comprising a time delay circuit coupled between the output of each of said second signal detection means and the input to the alarm to prevent the alarm indication during momentary changes in either signal caused between terminals of a terminal pair or the signal caused on the at least one terminal of a terminal pair.

11. A detecting apparatus for erroneous electrical connections between terminals of any pair of terminals and between different pairs of terminals of a matrix, the apparatus comprising:

a. a plurality of pairs of apparatus terminals;

b. means for applying an electrical signal between terminals of each said apparatus terminal pair and an electrical signal on at least one terminal of each terminal pair which forms cascaded signals from terminal pair to terminal pair;

c. first detecting means, for each apparatus terminal pair, having first and second inputs each of which is coupled to a different terminal of the corresponding apparatus terminal pair, the first detecting means providing first and second output signals responsive to first and second signal conditions in between terminals of the corresponding apparatus terminal pair;

d. second detecting means, for each apparatus terminal pair, for sensing a preselected signal on the at least one terminal of the corresponding apparatus terminal pair, the second detecting means having first and second inputs; and e. for each apparatus terminal pair i. means for coupling the output signal from the corresponding first detecting means to the first input of the corresponding second detecting means, and ii. means for coupling at least one of the terminals of the corresponding apparatus terminal pair to the second input of the corresponding second detecting means;

f. the second detecting means being operative for providing a first output signal responsive to said first signal from the first detecting means and said applied signal on the at least one terminal of the corresponding terminal pair and operative for providing a second output signal responsive to the lack of either one of such signals.

* * * * *